United States Patent
George et al.

(10) Patent No.: US 10,102,246 B2
(45) Date of Patent: Oct. 16, 2018

(54) NATURAL LANGUAGE CONSUMER SEGMENTATION

(71) Applicant: Adobe Systems Incorporated, San Jose, CA (US)

(72) Inventors: William Brandon George, Pleasant Grove, UT (US); Kevin Gary Smith, Lehi, UT (US); Walter Chang, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 351 days.

(21) Appl. No.: 14/513,410

(22) Filed: Oct. 14, 2014

(65) Prior Publication Data
US 2016/0103822 A1    Apr. 14, 2016

(51) Int. Cl.
G06F 17/27    (2006.01)
G06F 17/30    (2006.01)
G06Q 30/02    (2012.01)

(52) U.S. Cl.
CPC ........ G06F 17/3043 (2013.01); G06F 17/277 (2013.01); G06F 17/2795 (2013.01); G06Q 30/0204 (2013.01)

(58) Field of Classification Search
CPC .............. G06F 17/274; G06F 17/3043; G06Q 30/0204
USPC ............................................................ 704/9
See application file for complete search history.

(56) References Cited

U.S. PATENT DOCUMENTS

| | | | | |
|---|---|---|---|---|
| 7,082,455 B2* | 7/2006 | Hu | .......................... | H04L 29/06 709/203 |
| 7,765,097 B1* | 7/2010 | Yu | .......................... | G06F 17/243 704/9 |
| 8,244,573 B2* | 8/2012 | Hahn | ................ | G06F 17/30528 705/7.29 |

(Continued)

FOREIGN PATENT DOCUMENTS

EP    2048608 A1 *    4/2009    ............. G06Q 10/00

OTHER PUBLICATIONS

"Adobe® Marketing Cloud Analytics Segmentation", retreived from <http://microsite.omniture.com/t2/help/en_US/analytics/segment/analytics_segment.pdf> on Sep. 11, 2014.

*Primary Examiner* — Edwin S Leland, III
(74) *Attorney, Agent, or Firm* — Finch & Maloney PLLC

(57) ABSTRACT

Techniques are disclosed for using natural language processing techniques to define, manipulate, and interact with consumer segmentations. In such embodiments a content consumption analytics engine can be configured to receive and process a natural language segmentation query. The query may comprise, for example, a command that defines a new segmentation, a command that manipulates existing segmentations, or a command that solicits information relating to existing consumer segmentations. The query is parsed to identify individual grammatical tokens which are then correlated with specific segment token types through the use of a token repository. A custom thesaurus is used to identify synonymous terms for grammatical tokens which may not exist in the token repository. User feedback enables the custom thesaurus to learn additional synonyms for future use. Once the grammatical tokens are mapped onto the identified segment token types, a formal segment definition can be constructed based on a segment definition structure.

20 Claims, 11 Drawing Sheets

(56) References Cited

U.S. PATENT DOCUMENTS

| | | | | |
|---|---|---|---|---|
| 8,380,745 | B1* | 2/2013 | Nayfeh | G06Q 30/0251 707/783 |
| 8,700,468 | B2* | 4/2014 | Chang | G06Q 30/02 705/14.4 |
| 9,047,283 | B1* | 6/2015 | Zhang | G06F 17/30663 |
| 2007/0044060 | A1* | 2/2007 | Waller | G06F 17/5081 716/52 |
| 2007/0136066 | A1* | 6/2007 | Qu | G09B 19/04 704/260 |
| 2009/0327269 | A1* | 12/2009 | Paparizos | G06F 17/3064 |
| 2010/0088344 | A1* | 4/2010 | Treat | G06F 17/30867 707/794 |
| 2011/0231347 | A1* | 9/2011 | Xu | G06F 17/30864 706/12 |
| 2011/0270815 | A1* | 11/2011 | Li | G06F 17/2785 707/706 |
| 2013/0290317 | A1* | 10/2013 | Spivack | G06F 17/275 707/723 |
| 2014/0081626 | A1* | 3/2014 | Chang | G06F 17/2785 704/9 |
| 2014/0082500 | A1* | 3/2014 | Wilensky | G06F 3/0484 715/727 |
| 2016/0103822 | A1* | 4/2016 | George | G06Q 30/0204 704/9 |

* cited by examiner

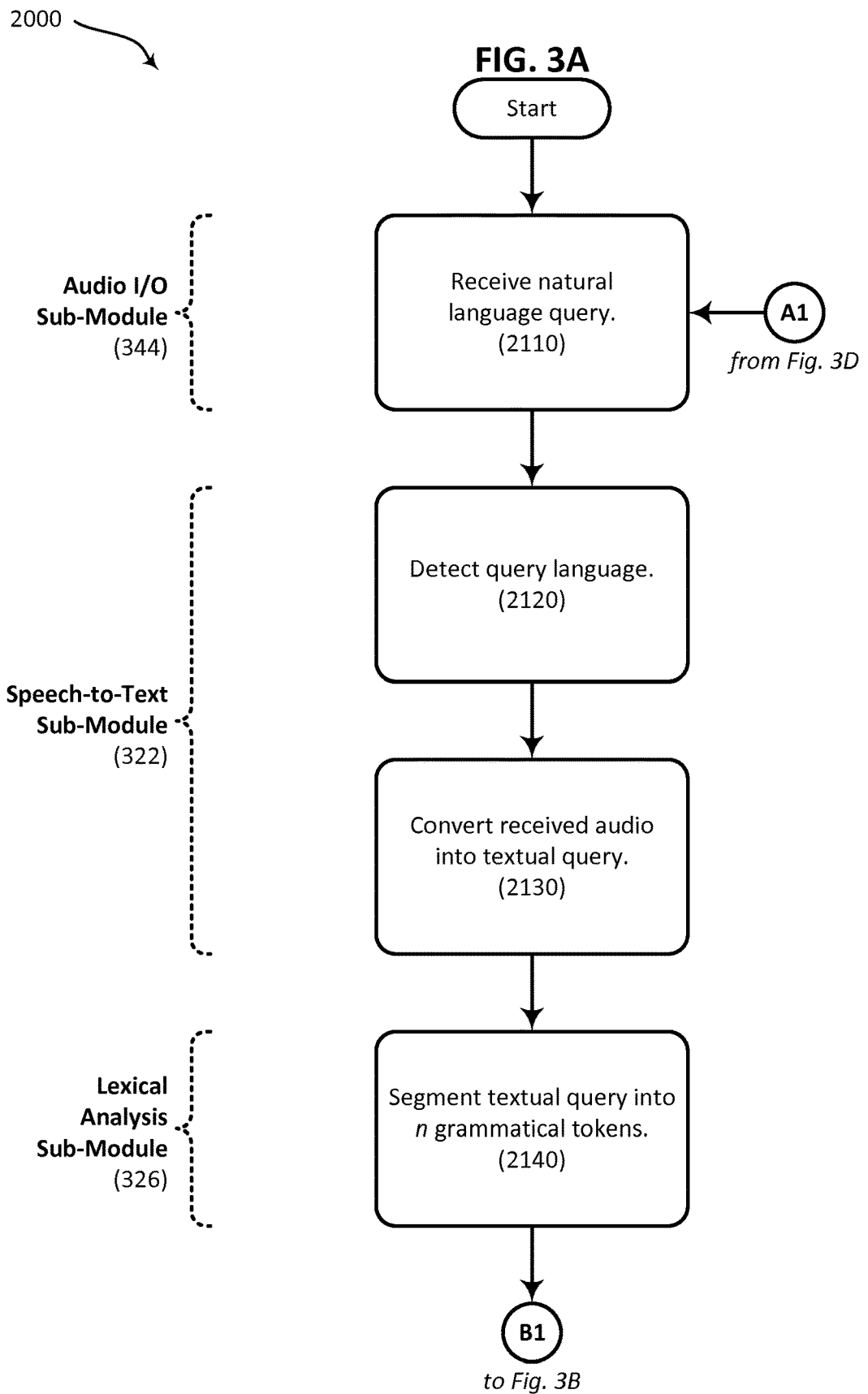

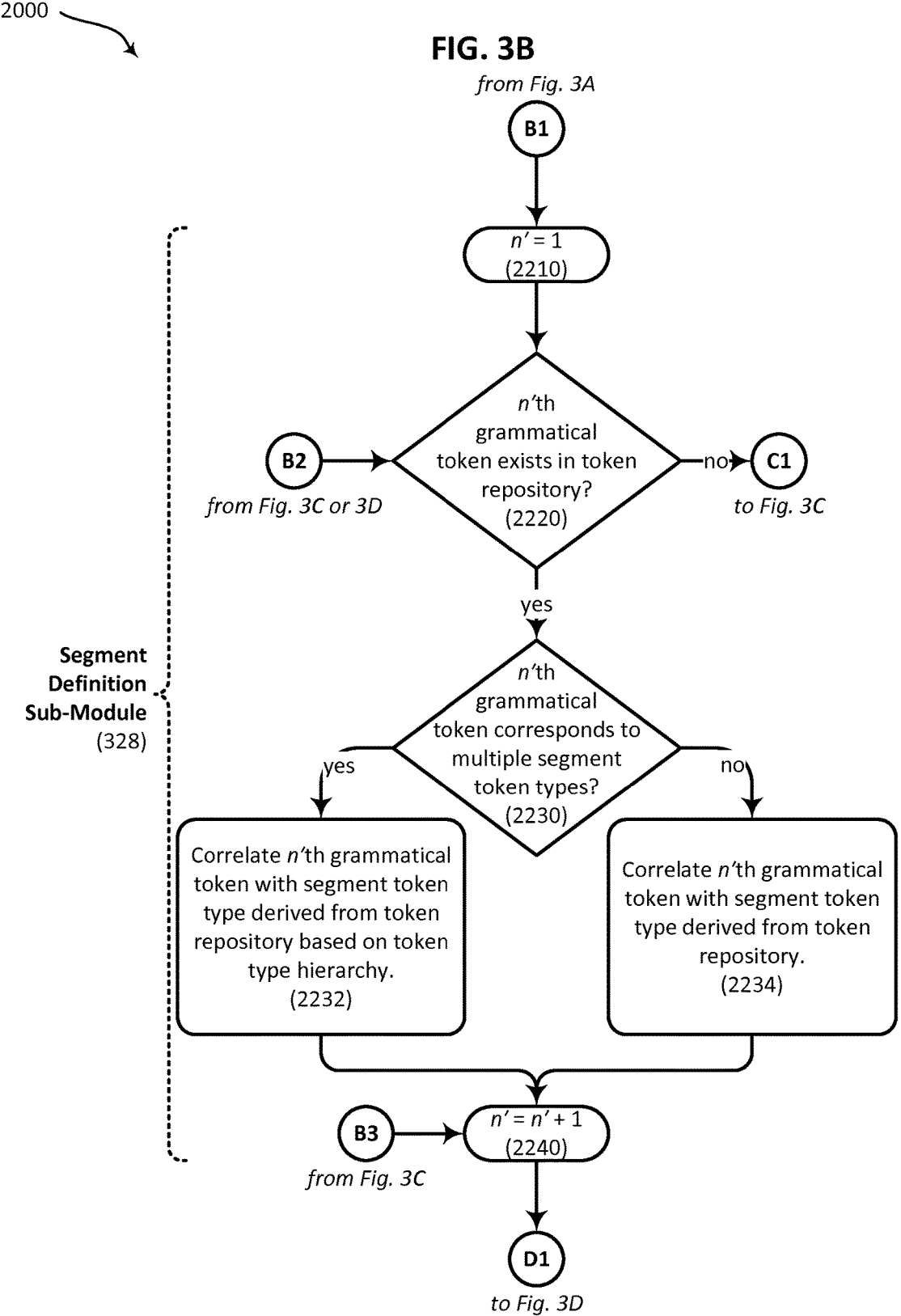

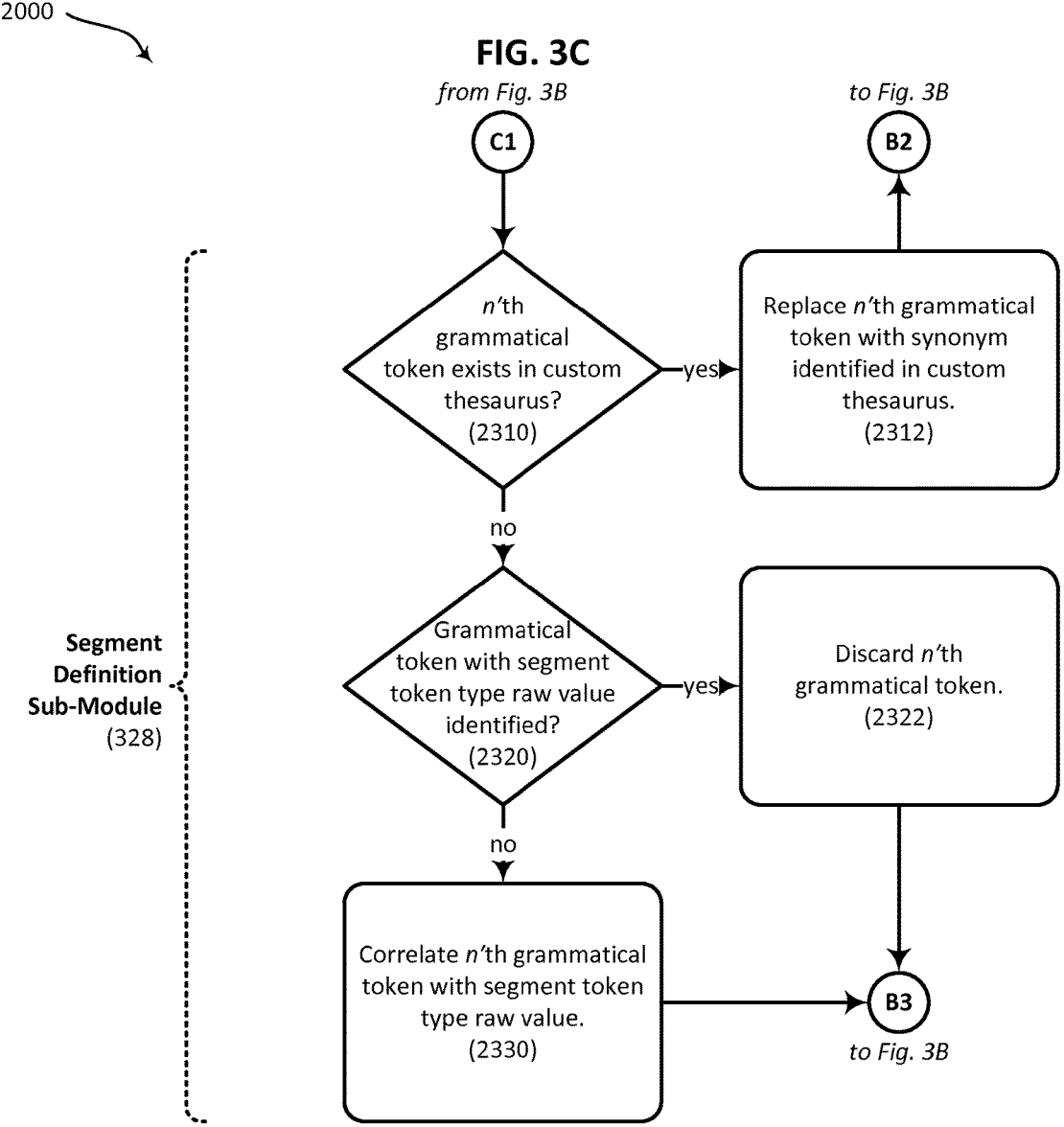

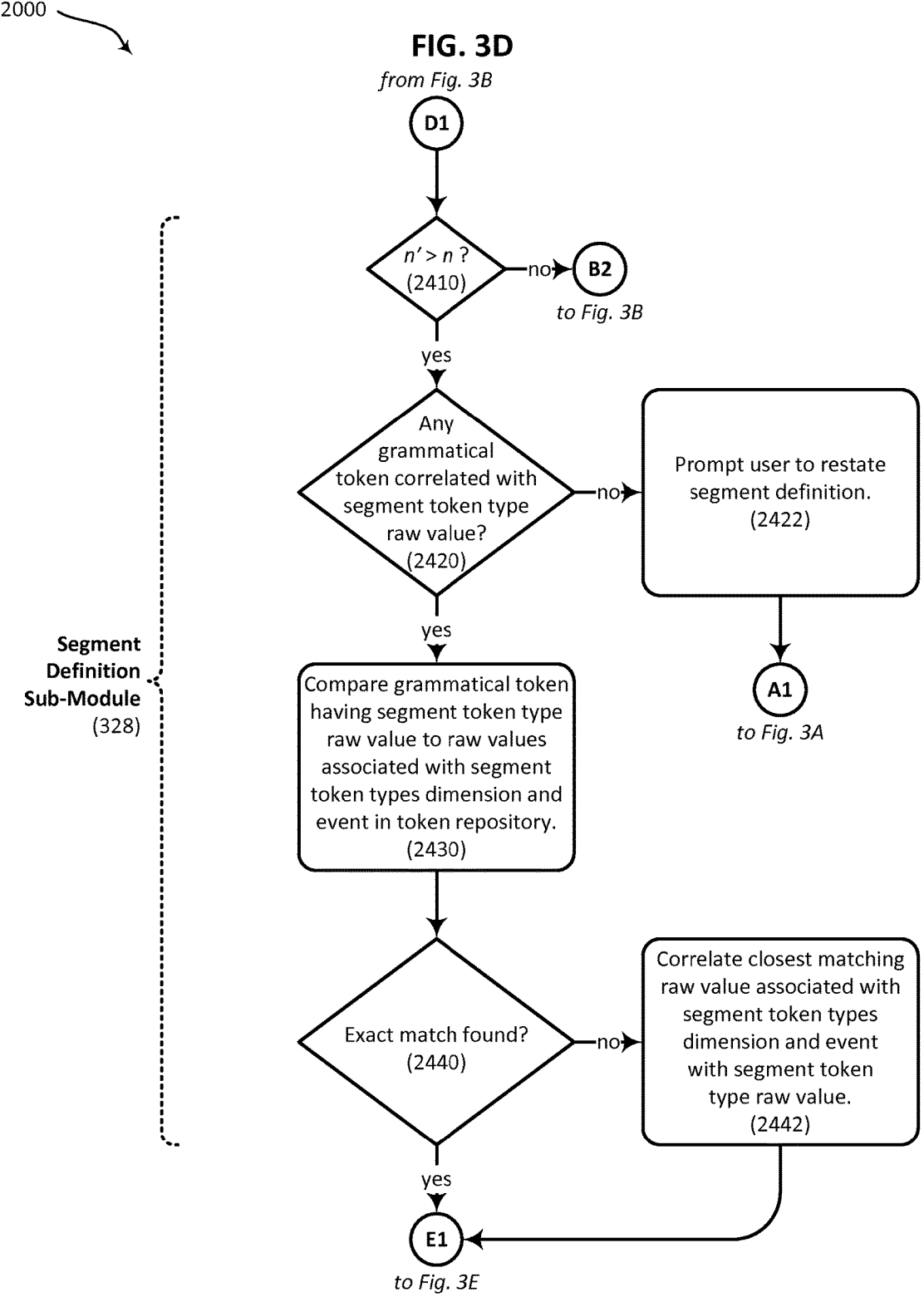

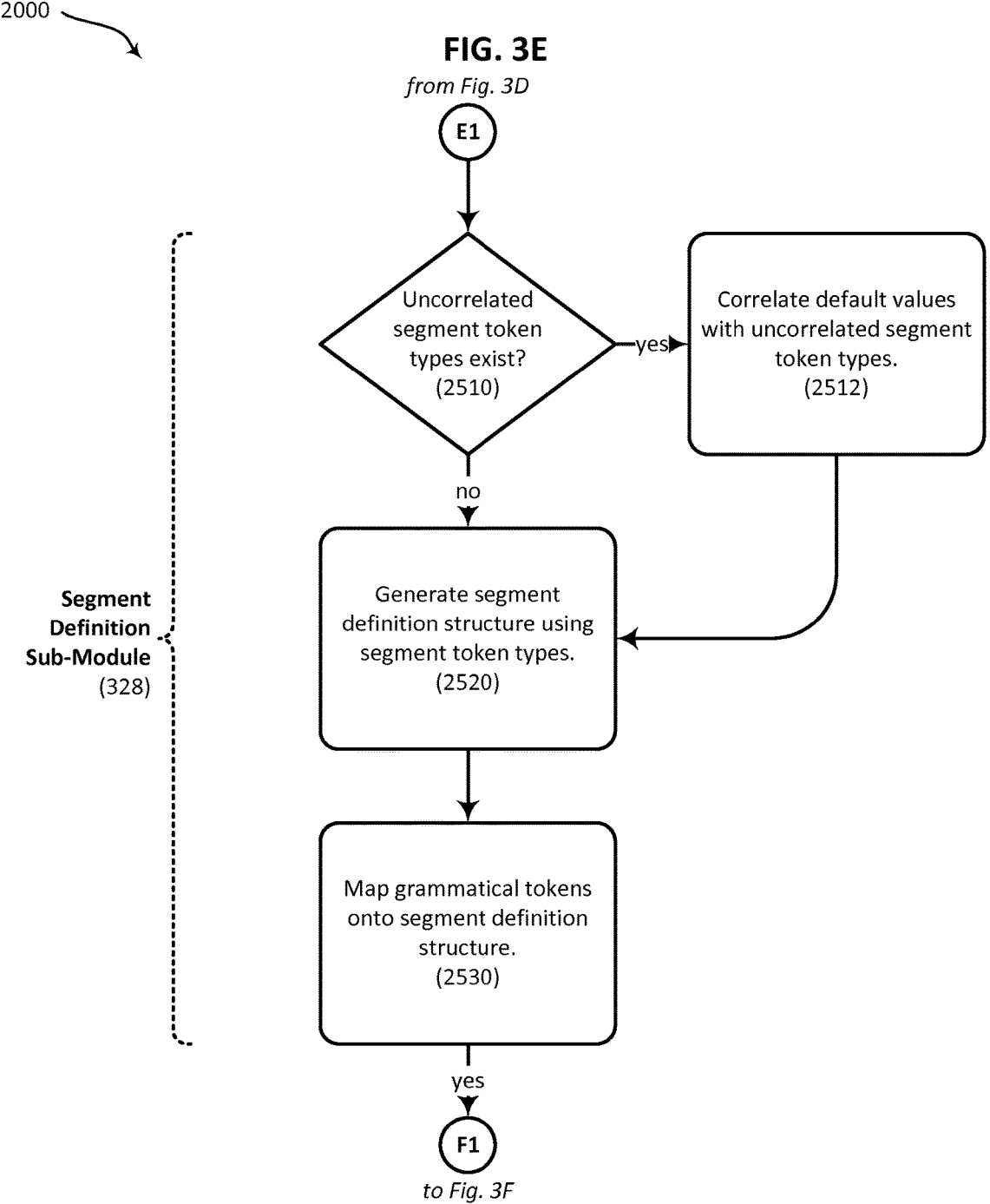

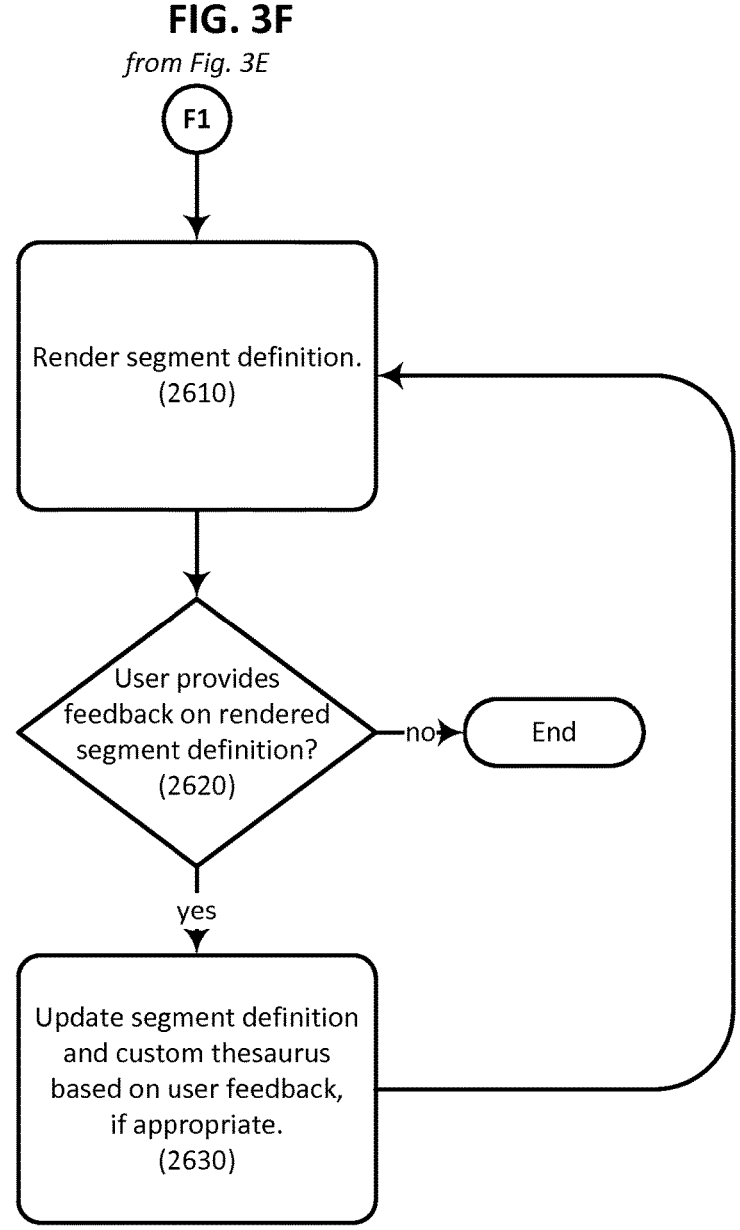

FIG. 4A

Token Repository
(350)

| Grammatical Token | Segment Token Type | Corresponding Raw Values for Segment Token Types "Domain"/"Event" |
|---|---|---|
| visitors | container | |
| came from | ∅ | |
| Facebook | ∅ | |
| referring domain | dimension | facebook.com<br>twitter.com<br>myspace.com |
| facebook.com | raw value | |
| bought | event | order values > 0 |

FIG. 4B

Custom Thesaurus
(355)

| Grammatical Token | Synonym |
|---|---|
| came from | referring domain |
| Facebook | facebook.com |
| referral | referring domain |

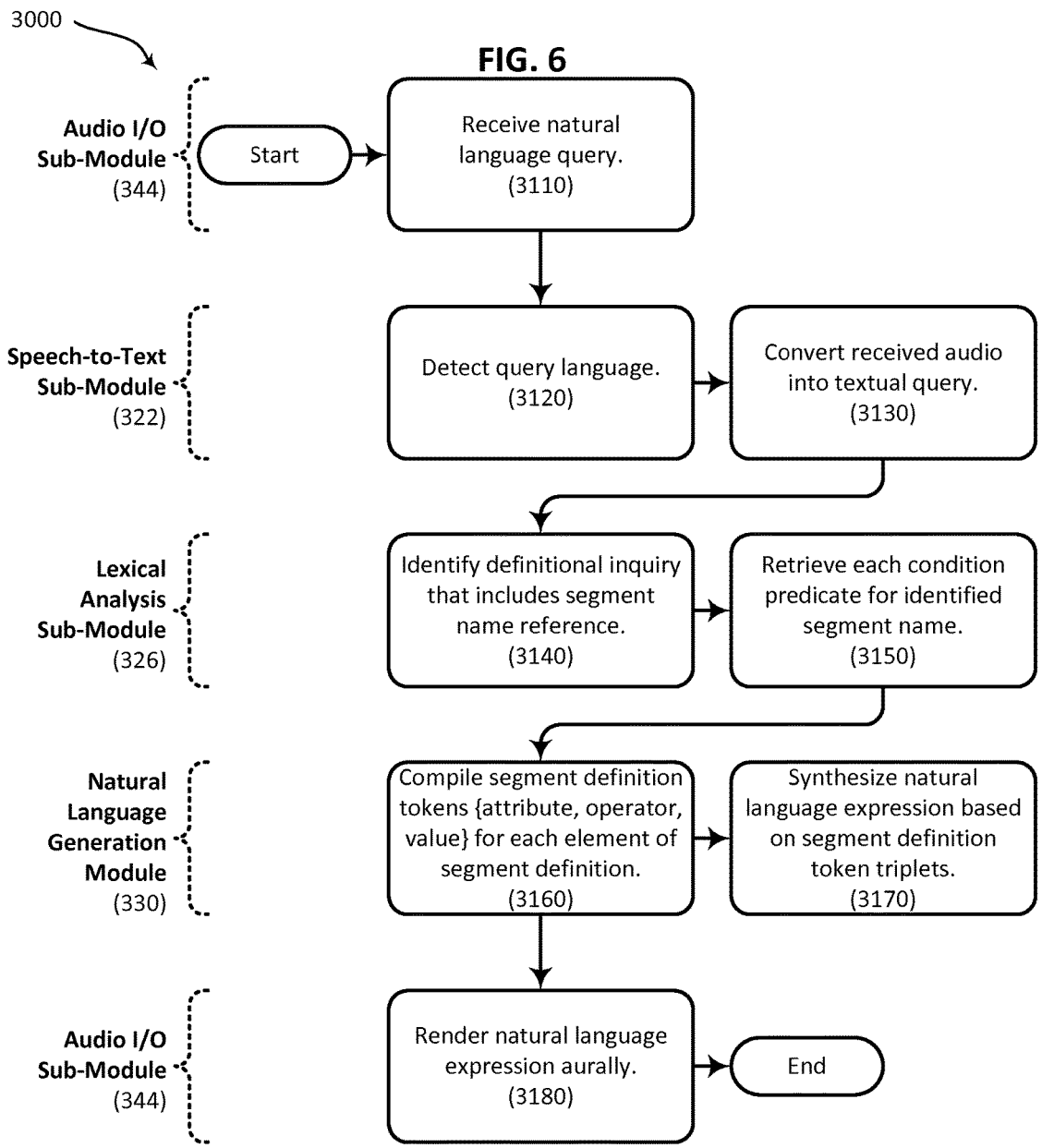

NATURAL LANGUAGE CONSUMER SEGMENTATION

FIELD OF THE DISCLOSURE

This disclosure relates generally to consumer segmentation, and more specifically to methods for using natural language processing techniques to define, manipulate, and interact with consumer segmentations.

BACKGROUND

With a continually expanding footprint that now exceeds two billion users, the Internet has become an increasingly important medium for information exchange. Businesses, governments, nonprofit organizations, informal social groups, and individuals routinely use the Internet to disseminate information, conduct advertising and public relations campaigns, engage in transactions, and communicate with each other. Given the wide range of content that is available online, as well as the vast quantity of users trying to locate specific content items, the viability of any online resource depends largely on its ability to deliver content that closely corresponds to consumer interest. As a result, website owners, marketers, and other content providers devote substantial resources to identifying specific consumer segments and generating content that is targeted to such segments. In general, understanding how users of an online resource, such as website visitors, can be segmented enables content providers to more effectively deliver targeted content and, ultimately, improve user experience.

BRIEF DESCRIPTION OF THE DRAWINGS

FIGS. 3A through 3F comprise a flowchart illustrating an example method for using natural language processing techniques to define a consumer segmentation.

FIG. 4A schematically illustrates an example token repository data structure that correlates grammatical tokens with (a) segment token types and (b) raw values corresponding to the segment token types "dimension" and "event".

FIG. 4B schematically illustrates an example custom thesaurus data structure that correlates grammatical tokens with synonymous grammatical terms.

FIG. 6 is a flowchart illustrating an example method for using natural language processing techniques to discover information about consumer segmentation definitions.

DETAILED DESCRIPTION

Figure 1:
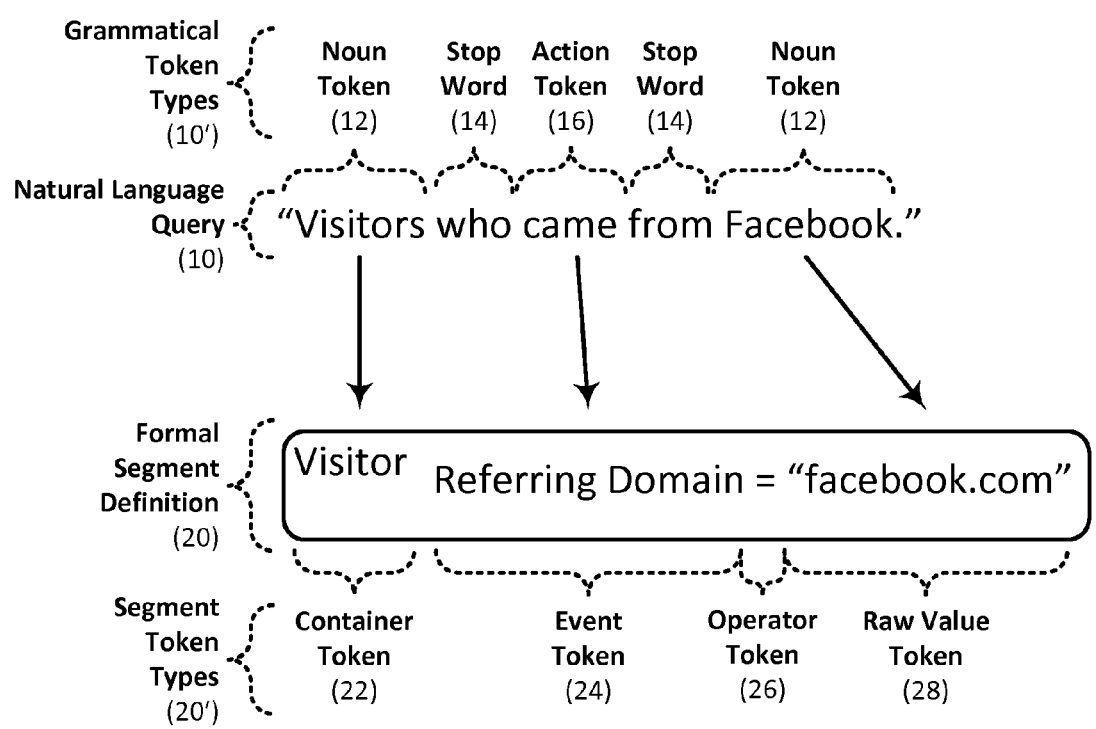
FIG. 1 schematically illustrates the mapping of an example natural language query onto a formalized consumer segment definition, as may be accomplished using certain of the embodiments disclosed herein.

Consumer segmentation is a powerful technique that helps content providers understand and respond to the different ways in which users interact with online resources. Unfortunately, existing tools for defining, manipulating, and interacting with consumer segmentations suffer from a number of shortcomings. Perhaps most significantly, existing consumer segmentation tools tend to be complex and difficult to use software applications which often require specialized training and knowledge to perform even fundamental tasks. For example, the syntax and terminology used to define consumer segmentations is often unintuitive, thus making it problematic for marketers without specific programming experience to define market segments. Even tools which use a graphical user interface to help simplify segmentation operations still often require specialized technical knowledge, acquisition of which can be tedious and time-consuming. This is because a typical rule defining a consumer segmentation will usually include a dimension or an event, specified values that need to be identified as corresponding to the dimension or event, and logic that describes how the matching values should be processed or organized. As a result, the difficulty involved in translating a natural language consumer segmentation that may exist in a marketer's mind to a formalized consumer segment definition that can be used by a software application often results in marketers not taking full advantage of segmentation resources, or worse, foregoing consumer segmentation altogether. Thus the complexity involved in working with existing consumer segmentation tools represents a substantial barrier that prevents marketers from fully leveraging the resources that such tools offer and the benefits that can be derived from consumer segmentation.

Thus, and in accordance with certain of the embodiments disclosed herein, techniques are disclosed for using natural language processing techniques to define, manipulate, and interact with consumer segmentations. In such embodiments a content consumption analytics engine can be configured to receive and process a natural language segmentation query. The query may comprise, for example, a command that defines a new segmentation, a command that manipulates existing segmentations, or a command that solicits information relating to existing consumer segmentations. The query is parsed to identify individual grammatical tokens which are then correlated with specific segment token types through the use of a token repository. A custom thesaurus is used to identify synonymous terms for grammatical tokens which may not exist in the token repository. User feedback enables the custom thesaurus to learn additional synonyms for future use. Once the grammatical tokens are mapped onto the identified segment token types, a formal segment definition can be constructed based on a segment definition structure. This enables a user to define consumer segmentations using natural language instead of a formalistic syntax required by a particular segmentation tool. In other implementations similar parsing techniques can be used to manipulate existing segmentations and discover information about existing segmentations. Numerous configurations and variations will be apparent in light of this disclosure.

A number of advantages are associated with certain of the disclosed embodiments. For example, using natural language processing techniques to define, manipulate, and interact with consumer segmentations reduces the extent to which specialized training and knowledge is required to perform such operations. This includes simplification of operations that aggregate or de-cluster segments to control segmentation granularity. This not only simplifies the process of working with consumer segmentations for existing users, but it also allows new users who do not have such specialized knowledge to obtain the benefits of consumer segmentation. Natural language processing also reduces the extent to which a user needs to use formalized syntax associated with intersection, union, and set difference operators to manipulate existing segmentations. The use of a custom thesaurus and other user feedback methods enhances the accuracy of the natural language comprehension techniques disclosed herein, thus making it easier for experienced and novice users alike to leverage such techniques. Finally, in the context of mobile implementations, users may not have the benefit of a large display area to define, discover, and interact with segment characteristics. Mobile users also may not have the benefit of a conventional input device such as keyboard or mouse. Thus, even for expert users who are capable of using existing consumer segmentation tools, the natural language processing techniques disclosed herein can make it easier to interact with such tools when not working with a conventional desktop computer, and in particular, can enable conversational interaction with consumer segmentations.

FIG. 1 schematically illustrates the mapping of an example natural language query onto a formalized consumer segment definition, as may be accomplished using certain of the embodiments disclosed herein. In particular, FIG. 1 illustrates a natural language query 10 provided by a user, such as a campaign manager using a content consumption analytics engine. Query 10 comprises a plurality of grammatical tokens, each of which has a grammatical token type 10'. For example, query 10 illustrated in FIG. 1 comprises two noun tokens 12, two stop words 14, and an action word 16. Collectively these grammatical tokens form a natural language phrase that defines the consumer segment "Visitors who came from Facebook". Using the techniques disclosed herein, query 10 can be mapped onto a formal segment definition 20, such as can be used by a content provider in the context of a marketing campaign. Formal segment definition 20 comprises a plurality of segment tokens, each of which corresponds to a grammatical token extracted from query 10, and each of which has a segment token type 20'. For example, formal segment definition 20 illustrated in FIG. 1 comprises a container token 22, an event token 24, an operator token 26, and a raw value token 28. Additional or alternative token types can be used in other implementations. The segment tokens are used to build formal segment definition 20 such that it has a logically meaningful structure and can be leveraged by a content provider. One example segment definition structure comprises an {event, operator, value} triplet which is defined within the context of a container. Another example segment definition structure comprises a {dimension, operator, value} triplet. Still other segment definition structures can be used in other embodiments.

As used herein, the term "data structure" refers broadly, in addition to its ordinary meaning, to a way of storing and organizing data in a computer accessible memory so the data can be used by an application or software module. In its simplest form, a data structure can be, for example, a set of one or more memory locations. In some cases, a data structure may be implemented as a so-called record, sometimes referred to as a struct or tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree, or hierarchical format having a number of nodes; an object format that includes data fields, for instance similar to a record; or a combination of the foregoing. A data structure may include executable code for accessing and modifying the underlying structure and format of the data stored therein. In a more general sense, the data structure may be implemented as a data set that can store specific values without being constrained to any particular order or format. In one embodiment, a data structure comprises a table correlating grammatical tokens with (a) segment token types and (b) raw values corresponding to the segment token types "dimension" and "event". In another embodiment a data structure comprises a table correlating grammatical tokens with synonymous grammatical terms. Numerous other data structure formats and applications will be apparent in light of this disclosure.

As used herein, the term "content" refers broadly, in addition to its ordinary meaning, to information intended for direct or indirect consumption by a user. For example, the term content encompasses information directly consumed by a user such as when it is displayed on a display device or printed on a piece of paper. The term content also includes information that is not specifically intended for display, and therefore also encompasses items such as software, executable instructions, scripts, hyperlinks, addresses, pointers, metadata, and formatting information. The use of the term content is independent of (a) how the content is presented to the user for consumption, and (b) the software application used to create and/or render the content. Content may be encoded using one or more compression algorithms intended to reduce the amount of bandwidth required for transmission of the content via a network. The term "digital content" refers to content which is encoded in binary digits (for example, zeroes and ones). Thus, in the context of applications involving digital computers, the terms "content" and "digital content" are often used interchangeably. The term "targeted content" refers to content which is targeted or otherwise intended, optimized, or prepared for consumption by a specific target audience, consumer segment, or other group.

As used herein, the term "content provider" refers broadly, in addition to its ordinary meaning, to a person, organization, or other human- or computer-controlled entity that generates, manages, administers, imports, or otherwise influences content and/or functionality provided by a computer system. In one sense, a content provider can be understood as representing the source of content in a workflow or process. It will be appreciated that a content provider may not necessarily be the creator or generator of particular content, but rather may simply be a user or entity that publishes the content item such that it is available for retrieval and consumption by a user. The term content provider is not limited to people or users, but also encompasses entities, organizations, and workstations which generate and/or publish content as part of a workflow. A content provider may also be referred to as an author, a publisher, a website owner, a campaign manager, or in the context of a marketing campaign, a marketer.

As used herein, the term "consumer" refers broadly, in addition to its ordinary meaning, to a user that receives content. Examples of consumers include a potential customer who is considering making a purchase, a citizen considering enlisting in the armed forces, a student who is researching a term paper, and a voter deciding how to cast a ballot. It will be appreciated that the term consumer may refer to individual people, groups of people, or legal organizations. The term "consumer segment" refers broadly, in addition to its ordinary meaning, to a subset of consumers who have common interests, priorities, and/or characteristics. Consumer segments can be defined based on a virtually unlimited range of criteria, including characteristics such as a consumer's geographic location, demographic profile, behavior with respect to a particular product or service, lifestyle, and combinations of the foregoing. Consumer segments can also be defined based on more technical criteria, such as how a consumer was referred to a website, how a consumer navigates within a website, or how a consumer interacts with website functionality. Content may be adapted for a consumer segment using a variety of techniques, including by adding information understood to be of particular interest to certain consumers, or by removing information that certain consumers may find to be irrelevant, offensive, or otherwise not of interest.

As used herein, the term "token" refers broadly, in addition to its ordinary meaning, to a string of one or more characters that carries some significance when combined as a group. Thus, for example, in the case of a textual phrase that is formed from a group of words, each of the words can be understood as a token. The term "grammatical token" refers to a token that forms part of a larger grammatical unit such as a clause, a phrase, a sentence, or a paragraph. The term "segment token" refers to a token that forms part of a segment definition. In some cases two or more words can be understood as forming a single token where the combination of such words carries some significance. Thus, for example, in some applications the phrases "but for" and "that which" can be understood as single tokens since these words carry specific meaning when combined. Both grammatical and segment tokens can be understood as having a "type" which provides some indication of the function that such token plays in a grammatical structure or segment definition. Example grammatical token types include nouns, verbs, stop words, and conjunctions. Example segment token types include "container", "dimension", "event", "operator", and "raw value".

System Architecture

Figure 2:
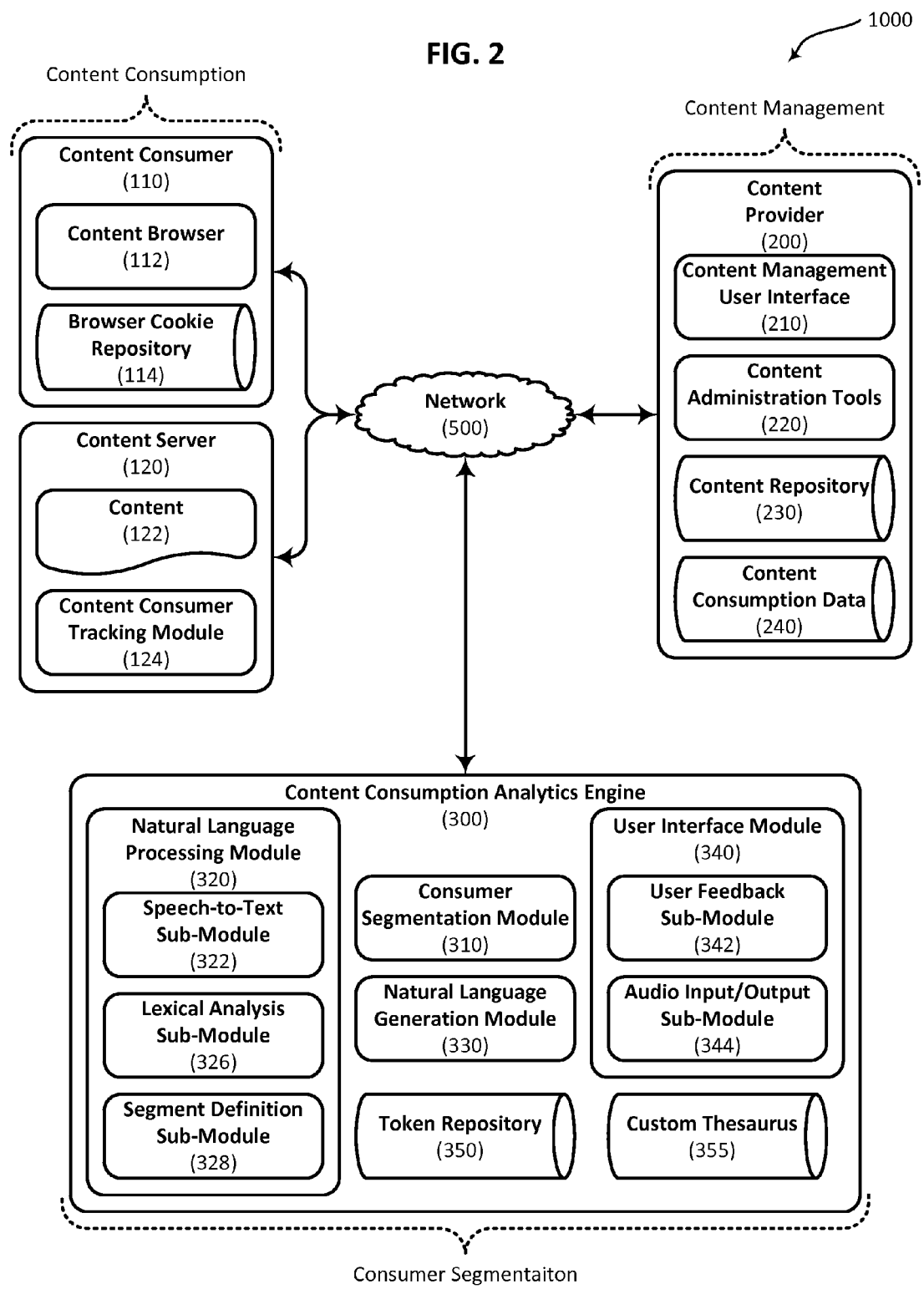
FIG. 2 is a block diagram schematically illustrating a networked computer system that can be used to implement natural language processing techniques that are capable of defining, manipulating, and interacting with consumer segmentations.

FIG. 2 is a block diagram schematically illustrating a networked computer system 1000 that can be used to implement natural language processing techniques that are capable of defining, manipulating, and interacting with consumer segmentations. In such embodiments content consumption is represented by a content consumer 110 and a content server 120, both of which are connected to, and can communicate with each other via, a network 500. Content consumer 110 can use a content browser 112 to retrieve and view content 122 that is hosted by content server 120. In one embodiment content server 120 is a single stand-alone server configured to respond to requests for content 122 from content consumer 110, while in other embodiments content server 120 comprises a geographically distributed network of hundreds, thousands or more servers capable of delivering content 122 to an even larger number of content consumers 100. Thus while one implementation involves content consumer 110 using a web browser to retrieve and view webpages hosted by a website server, in alternative embodiments content consumer 110 and content server 120 represent networked clients and one or more servers, respectively, operating in a generalized client-server computing environment.

In some implementations, such as in the context of certain interactions that occur via the World Wide Web (WWW), communications between content consumer 110 and content server 120 conform to the hypertext transfer protocol (HTTP), which is a stateless protocol. As a result, in such implementations content server 120 does not retain information about content consumer 110. To compensate for this, content browser 112 can be configured to store information using "browser cookies", which are also sometimes referred to as HTTP cookies, web cookies, or simply cookies. A browser cookie is a data structure that contains information regarding content consumer 110, such as personally identifying information and/or browsing history information. Browser cookies can be stored in a browser cookie repository 114 that is administered by content consumer 110, and such cookies can be sent to content server 120 along with a request for particular content 122. Accessing the data stored in a browser cookie enables content server 120 to identify content consumer 110 as being associated with a particular consumer segment, and therefore allows content server 120 to customize, modify, or otherwise adapt content 122 to be more specifically targeted to content consumer 110. The data provided in a browser cookie also enables a content consumer tracking module 124 to establish a link between a particular content consumer and the content that consumer has accessed.

Still referring to the example embodiment illustrated in FIG. 2, content management is represented by a content provider 200. Like content consumer 110 and content server 120, content provider 200 is also in communication with network 500. In certain embodiments content provider 200 may be a generator, publisher, and/or manager of content, such as in the case of an online magazine, a website owned by a newspaper company, a blog, a government website that disseminates information to the public, or a corporate website that provides information to customers and potential customers. In certain applications content provider 200 may also manage the technical operations of content server 120. Content provider 200 may additionally or alternatively be an advertiser that generates promotional content configured to be incorporated into other content that is provided by content provider 200 or that is provided by a third party. In any case, certain of the embodiments disclosed herein provide tools that content provider 200 can use to define, manipulate, and interact with consumer segmentations that form the basis of a targeted content delivery campaign.

Content provider 200 may use a number of different tools for managing content 122. Such tools may include a content management user interface 210 that facilitates authoring and administration of content 122. Content management user interface 210 may be provided, for example, by any of a variety of suitable content authoring applications. In other embodiments content can additionally or alternatively be procured from one or more third-party content generation sources. For example, data aggregators can be used to gather information from other sources and generate content based on the aggregated data, either in an automated or semi-automated fashion. Regardless of how it is obtained, the content can be stored in a content repository 230, and when ready for publishing can be deployed to content server 120 where it is hosted for retrieval by content consumer 110. Content provider 200 may also include content administration tools 220 which provide functionality such as assembly of content based on the generated or otherwise acquired content, development of active content, and analysis of how consumers browse, interact with, and consume content. For example, in certain embodiments content administration tools 220 include tools that can be used to collect content consumption data 240 and analyze how content consumers interact with and consume content 122. In such embodiments content administration tools 220 can be configured to leverage functionality provided by a content consumption analytics engine 300, as will be described in turn.

Again referring to the example embodiment illustrated in FIG. 2, content consumption analytics engine 300 can be configured to use natural language processing techniques to define, manipulate, and interact with consumer segmentations. Content consumption analytics engine 300, which is also in communication with network 500, thus represents functionality associated with consumer segmentation. In one embodiment, content consumption analytics engine 300 includes a consumer segmentation module 310 configured to provide functionality such as segment definition and manipulation. Such functionality operates on input that is received by a user interface module 340 and processed by a natural language processing module 320. For example, in one embodiment user interface module 340 includes an audio input/output sub-module 344 configured to receive an input audio signal, such as may be detected using a microphone, and convert the received signal to a digital audio signal for further processing. In other embodiments the functionality associated with audio input/output sub-module 344 can be provided by one or more networked computing resources which are external to content consumption analytics engine 300. In still other embodiments audio input/output sub-module 344 is omitted altogether, and user interface module 340 is configured to receive a natural language query via textual input received from, for example, a tactile or virtual keyboard.

Natural language processing module 320 can be configured to further process the received natural language query so as to produce a segment definition, such as formal segment definition 20 illustrated in FIG. 1. In certain embodiments natural language processing module 320 comprises a speech-to-text sub-module 322, a lexical analysis sub-module 326, and a segment definition sub-module 328. Speech-to-text sub-module 322 can be configured to convert the received audio signal into a textual query. This may include, in certain implementations, detecting the language of the recorded audio signal. In embodiments wherein the natural language query is entered textually, such as using a virtual or tactile keyboard, certain functionality associated with speech-to-text sub-module 322 is optional. Once a textual query is available, lexical analysis sub-module 326 can be invoked to segment the textual query into one or more grammatical tokens, each of which can be associated with a segment token type. In such embodiments segment definition sub-module 328 then constructs a formal segment definition using the grammatical tokens and the segment token types resolved by lexical analysis sub-module 326. The formal segment definition is based on a segment definition structure. Additional details regarding the functionality associated with natural language processing module 320 and its subcomponents will be disclosed in turn.

In some cases lexical analysis sub-module 326 may not be able to independently map the grammatical tokens onto segment definition tokens. Such ambiguities may be resolved using relationships established in a token repository 350 and/or a custom thesaurus 355. For example, in one embodiment token repository 350 comprises a data structure correlating grammatical tokens with (a) segment token types and (b) raw values corresponding to the segment token types "dimension" and "event". This enables grammatical tokens resolved by lexical analysis sub-module 326 to be mapped onto particular segment token types with a relatively high degree of confidence. This also enables grammatical tokens which are suspected to correspond to a raw value—for example because such tokens do not correspond to any other known segment type—to be associated with an appropriate dimension or event. Custom thesaurus 355 correlates grammatical tokens with synonymous grammatical terms. In certain embodiments user interface module 340 includes a user feedback sub-module 342 that is configured to update token repository 350 and/or custom thesaurus 355 based on user feedback, such as user approval or rejection of proposed segment definitions derived from received natural language queries. The grammatical tokens associated with the "dimension" and "event" segment token types listed in token repository 350 may be specially customized to include terminology used in a particular industry or by a particular content provider.

Still referring to FIG. 2, content consumption analytics engine 300 includes a natural language generation module 330. In some cases, a received natural language query may comprise a request for information regarding existing segmentations. Where this occurs, speech-to-text module 322 can be configured to identify the natural language query as including a definitional inquiry having a segment name reference. Natural language generation module 330 then determines an {attribute, operator, value} triplet for each element of the segment corresponding to the definitional inquiry. The result is a natural language expression of the segment definition which can be synthesized and verbalized by an optional text-to-speech sub-module and/or audio input/output sub-module 344. In alternative embodiments the natural language expression of the segment definition can be rendered textually instead of aurally.

Networked computer system 1000 can be implemented using a wide range of hardware and software. For example, content consumer 110, content server 120, content provider 200, and content consumption analytics engine 300 may each comprise one or more devices selected from a desktop computer, a laptop computer, a workstation, a tablet computer, a smartphone, a handheld computer, a set-top box, an enterprise class server, or any other suitable computing device. Such devices may include peripheral and/or integrated hardware components that are suitable for a given device operating in a given use context. For example, in one embodiment the functionality associated with content consumption analytics engine 300 is provided on a tablet computer that includes an integrated microphone capable of recording spoken natural language queries, as well as an integrated speaker capable of announcing spoken output. In other embodiments the functionality associated with content consumption analytics engine 300 is provided by an enterprise class server device capable of communicating with one or more portable client devices. In such an implementation, the client devices may comprise mobile devices such as smartphones and/or tablet computers that are running an application configured to leverage software functionality provided by content consumption analytics engine 300 as well as hardware functionality provided by the mobile device (such as a microphone, a speaker, and/or a display).

Other componentry and functionality not reflected in the schematic block diagram of FIG. 2 will be readily apparent in light of this disclosure, and it will therefore be appreciated that the claimed invention is not intended to be limited to any specific firmware and/or software configuration. Thus other configurations and subcomponents can be used in other embodiments. For example, although not illustrated in FIG. 2 for purposes of clarity, in one embodiment content consumption analytics engine 300 includes, among other things, a processor, a memory resource, an operating system, a communications adaptor, and a bus and/or interconnect. Such subcomponents may also be included in various implementations of content consumer 110, content server 120, and content provider 200. As disclosed herein, in one embodiment content consumer 110, content server 120, content provider 200, and content consumption analytics engine 300 are connected via network 500, which may be a local area network (such as a home-based or office network), a wide area network (such as the Internet), or a combination of such networks, whether public, private, or both. In some cases access to resources on a given network or computing system may require credentials such as usernames, passwords, or any other suitable security mechanism.

The processor disclosed herein can be implemented using any suitable processor, and may include one or more coprocessors or controllers, such as a graphics processing unit or an audio processor, to assist in control and processing operations associated with the various components of networked computer system 1000. Likewise, the memory resource can be implemented using any suitable type of digital storage, such as one or more of a disk drive, a universal serial bus (USB) drive, flash memory, random access memory, or any suitable combination of the foregoing. In the context of content consumption analytics engine 300, the memory resource can be used, for example, to store token repository 350 and custom thesaurus 355. The operating system may comprise any suitable operating system, such as Google Android (Google Inc., Mountain View, Calif.), Microsoft Windows (Microsoft Corp., Redmond, Wash.), or Apple OS X (Apple Inc., Cupertino Calif.). As will be appreciated in light of this disclosure, the techniques provided herein can be implemented without regard to the particular operating system provided in conjunction with a given component, and therefore may also be implemented using any suitable existing or subsequently-developed platform. The communications adaptor can be implemented using any appropriate network chip nor chipset which allows for wired and/or wireless connection to network 500 and/or other computing devices and resources. The bus and/or interconnect can be configured to provide for intra- and inter-device communications using, for example, the communications adaptor.

The embodiments disclosed herein can be implemented in various forms of hardware, software, firmware, or special purpose processors. For example, in one embodiment a non-transitory computer readable medium has instructions encoded thereon that, when executed by one or more processors, cause one or more of the natural language consumer segmentation methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, including marketing campaign management applications and targeted content delivery applications. The functionalities disclosed herein can additionally or alternatively leverage services provided by separate software applications, such as sentiment analysis applications. The computer software applications disclosed herein may include a number of different modules, sub-modules, or other components of distinct functionality, and can provide information to, or receive information from, still other components and/or services. These modules can be used, for example, to communicate with input and/or output devices such as a display screen, a touch sensitive surface, a printer, and/or any other suitable input/output device. Other components and functionality not reflected in the illustrations will be apparent in light of this disclosure, and it will be appreciated that the claimed invention is not intended to be limited to any particular hardware or software configuration. Thus in other embodiments content consumption analytics engine 300 may comprise additional, fewer, or alternative subcomponents as compared to those included in the example embodiment illustrated in FIG. 2. For example, in one alternative embodiment content consumption analytics engine 300 is incorporated into hardware associated with content provider 200.

The aforementioned non-transitory computer readable medium may be any suitable medium for storing digital information, such as a hard drive, a server, a flash memory, and/or random access memory. In alternative embodiments, the computer and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present invention is not intended to be limited to any particular system architecture.

Methodology

FIGS. 3A through 3F comprise a flowchart illustrating an example method 2000 for using natural language processing techniques to define a consumer segmentation. As can be seen, consumer segment definition method 2000 includes a number of phases and sub-processes, the sequence of which may vary from one embodiment to another. However, when considered in the aggregate, these phases and sub-processes form a complete consumer segment definition method that is responsive to user commands in accordance with certain of the embodiments disclosed herein. This method can be implemented, for example, using the system architecture illustrated in FIG. 2. However other system architectures can be used in other embodiments, as will be apparent in light of this disclosure. To this end, the correlation of the various functionalities shown in FIGS. 3A through 3F to the specific components illustrated in FIG. 2 is not intended to imply any structural and/or use limitations. Rather, other embodiments may include varying degrees of integration wherein multiple functionalities are performed by one system or by separate systems. For instance, in an alternative embodiment a single module can be used to record a natural language query, detect the query language, and convert the received audio into a textual query. Thus other embodiments may have fewer or more modules and sub-modules depending on the granularity of implementation. Numerous variations and alternative configurations will be apparent in light of this disclosure.

Still referring to FIGS. 3A through 3F, method 2000 commences with audio input/output sub-module 344 receiving a natural language query. See reference numeral 2110 in FIG. 3A. One example of a natural language query is illustrated in FIG. 1. The natural language query can be received using any appropriate input device, such as a microphone that is integrated into a smartphone or a tablet computer. In one embodiment the natural language query is received using the same device on which content consumption analytics engine 300 is implemented, while in other embodiments the natural language query is received using a portable device that is in communication with a server that provides functionality associated with content consumption analytics engine 300. In embodiments where a natural language query is typed instead of spoken, receiving the natural language query may comprise receiving textual input that is typed using a tactile or virtual keyboard.

In some instances the language of the received natural language query may be unknown. In such case, speech-to-text sub-module 322 can be configured to detect the query language using any appropriate existing or subsequently-developed language detection algorithm. See reference numeral 2120 in FIG. 3A. Speech-to-text sub-module 322 is also optionally configured to convert a received audio query into a textual query. See reference numeral 2130 in FIG. 3A. In some cases language detection and audio conversion can be performed concurrently and may involve overlapping and/or shared operations. Although described in the context of an English query, in other embodiments method 2000 can be adapted to process non-English queries, such as with the use of an alternative non-English language token repository and custom thesaurus. Thus in such embodiments content consumption analytics engine 300 can be configured to include multiple such repositories and thesauruses, thereby facilitating processing of multilingual queries. In other implementations language detection functionality may be omitted, in which case method 2000 is intended to process natural language queries in a single default language. Likewise, where the natural language query is typed instead of spoken, the process of converting a received audio query to a textual query can be omitted.

Once a textual query of known language is produced, lexical analysis sub-module 326 can be configured to segment the textual query into n grammatical tokens. See reference numeral 2140 in FIG. 3A. Such segmentation may include operations such as removal of stop words and/or aggregation of words into recognized grammatical tokens. To enable sequential analysis of the n grammatical tokens, segment definition sub-module 328 compares the quantity n to a token counting parameter n' which is initially set such that n'=1. See reference numeral 2210 in FIG. 3B.

In general, regardless of how it is received, the natural language query may correspond to a variety of different user operations. For example, in some cases the query may comprise a user command to establish a new consumer segmentation. The new segmentation may be based on an entirely new definition, or on a command to combine or otherwise manipulate existing segmentations. In other cases the query may comprise a user request for information regarding existing segmentations. Content consumption analytics engine 300 can be configured to distinguish these and other query types in a number of ways. In one implementation content consumption analytics engine 300 is configured to interpret a natural language query prefix that identifies the query type. For example, a query beginning with "Define a new segment [name] that consists of . . . ", or the like, can be interpreted as a command to establish a segmentation based on an entirely new definition. Likewise, a query beginning with "Define a new segment [name] by combining . . . ", or the like, can be interpreted as a command to establish a segmentation based on manipulating existing segmentations, for example using Boolean operators. On the other hand, a query beginning with "What is [name] . . . ", or the like, can be interpreted as a request for information regarding an existing segmentation. In alternative implementations the user submitting the query can identify the query type separately from submission of the query itself, such as via a user interface configured to receive a query type selection.

Where the query is identified as a request to define a new consumer segmentation based on an entirely new definition, the grammatical tokens comprising the query are correlated with known segment token types. This can be accomplished with reference to token repository 350. FIG. 4A schematically illustrates an example token repository data structure that correlates grammatical tokens with (a) segment token types and (b) raw values corresponding to the segment token types "dimension" and "event". Using such a data structure, a given grammatical token can be correlated with a segment token type. For example, the grammatical token "visitors" can be correlated with the segment token type "container". Thus in certain embodiments method 2000 comprises using segment definition sub-module 328 to determine whether the n'th grammatical token exists in token repository 350. See reference numeral 2220 in FIG. 3B. Approximate string matching can be used to identify both similar and exact matches between the n'th grammatical token and the tokens listed in token repository 350. Where the n'th grammatical token exists in token repository 350, it is further determined whether such token corresponds to multiple segment token types. See reference numeral 2230 in FIG. 3B. If not, the n'th grammatical token can be correlated with the corresponding segment token type derived from token repository 350. See reference numeral 2234 in FIG. 3B. On the other hand, if the n'th grammatical token corresponds to multiple segment token types, the appropriate segment token type can be selected based on a hierarchy of segment token types. See reference numeral 2232 in FIG. 3B. In one implementation, this hierarchy is: {dimension→event→operator→raw value}. Other default hierarchies can be used in other embodiments.

Where the n'th grammatical token does not exist in token repository 350, segment definition module 328 determines whether the n'th grammatical token exists in custom thesaurus 355. See reference numeral 2310 in FIG. 3C. As illustrated in FIG. 4B, custom thesaurus 355 correlates grammatical tokens which may not be correlated with a segment token type in token repository 350 with synonymous grammatical tokens which may have such correlation. If the n'th grammatical token does exist in custom thesaurus 355, it can be replaced with the corresponding synonym provided in custom thesaurus 355. See reference numeral 2312 in FIG. 3C. The replacement synonym can then be sequentially processed as illustrated in FIG. 3B. This may lead to generation of multiple alternative segment definitions which can be presented for user review, as will be described in turn. Where the n'th grammatical token is associated with multiple synonyms in custom thesaurus 355, one or more of such multiple synonyms can be processed as illustrated in FIG. 3B. If the n'th grammatical token does not exist in custom thesaurus 355, it can be determined whether a grammatical token has already been correlated with the segment token type "raw value". See reference numeral 2320 in FIG. 3C. If not, the n'th grammatical token is correlated with segment token type "raw value". See reference numeral 2330 in FIG. 3C. Otherwise, the n'th grammatical token is discarded. See reference numeral 2322 in FIG. 3C.

Once the n'th grammatical token is either correlated with a segment token type or discarded, the token counting parameter n' is incremented. See reference numeral 2240 in FIG. 3B. It can then be determined whether n'>n. See reference numeral 2410 in FIG. 3D. If not, the next grammatical token is processed as described herein. On the other hand, if all of the grammatical tokens have been processed then segment definition sub-module 328 determines whether any grammatical token has been correlated with segment token type "raw value". See reference numeral 2420 in FIG. 3D. If not, the user is prompted to restate or reenter the segment definition, which can then be processed as described above. See reference numeral 2422 in FIG. 3D. On the other hand, if a grammatical token has been correlated with segment token type "raw value", this grammatical token is compared to the raw values associated with segment token types "dimension" and "event" in token repository 350. See reference numeral 2430 in FIG. 3D. Approximate string matching can be used to determine whether an exact or approximate match is found. See reference numeral 2440 in FIG. 3D. If an exact match is not found, then the closest matching raw value associated with segment token types "dimension" and "event" is correlated with segment token type "raw value". See reference numeral 2442 in FIG. 3D. For example, with reference to example token repository 350 illustrated in FIG. 4A, if the segment token type "raw value" is correlated with grammatical token "Twitter", an exact match for this grammatical token does not exist in token repository 350. However, approximate match "twitter.com" does exist. In this case, the closest matching raw value associated with segment token types "dimension" and "event" ("twitter.com") will be correlated with segment token type "raw value".

A grammatical token which is correlated with a segment token type in token repository 350 can be referred to as a validated grammatical token. In some cases a validated grammatical token will be identical to a grammatical token extracted from a natural language query. However, in other cases, such as where custom thesaurus 355 is used to identify a synonym for a grammatical token that is not correlated with a segment token type in token repository, the validated grammatical token and the grammatical token extracted from the natural language query will be different.

In general, a customer segmentation definition should include certain segment token types such as "container", "dimension" or "event", "operator", and "value". The specific segment token types which are required in a particular implementation may vary, and thus this list should not be understood as a requirement for all implementations. Other embodiments may call for additional, alternative, or fewer segment token types. Given a certain minimum set of segment token types for a certain application, segment definition sub-module 328 can be configured to determine whether uncorrelated segment token types exist. See reference numeral 2510 in FIG. 3E. If so, default values can be correlated with the uncorrelated segment token types. See reference numeral 2512 in FIG. 3E. In one embodiment, the default value for the container segment token is "visitors", the default value for the dimension or event segment token is "page", and the default value for the operator segment token is "equals". Other default values can be used in other embodiments.

A consumer segment definition can be understood as being based on an underlying segment definition structure. The segment definition structure comprises a collection of segment token types that are arranged in a particular manner and that serve as placeholders for grammatical tokes. When grammatical tokens are substituted for these placeholders based on the previously defined correlations between grammatical tokens and segment token types, a consumer segment definition results. While a variety of different segment definition structures can be used, in one embodiment the structure comprises a {dimension, operator, value} triplet that is placed in a {container}. The particular segment definition structure used in a given implementation can be generated based on a default or user-specified structure, and can be expressed in terms of a specific sequence of segment token types. See reference numeral 2520 in FIG. 3E. Given this structure, segment definition sub-module 328 can be configured to map grammatical tokens onto the structure based on the previously defined correlations between grammatical tokens and segment token types. See reference numeral 2530 in FIG. 3E. In some cases, for example where logical operators such as "and" and/or "or" are identified in the natural language query, the segment definition structure can include multiple criteria which define the segment.

Once grammatical tokens have been mapped onto the segment definition structure, consumer segmentation module 310 is optionally configured to render the resulting segment definition. See reference numeral 2610 in FIG. 3F. The segment definition can be rendered in a variety of different ways, such as by storing the newly defined segment in a memory location or displaying a formalized or a natural language representation of the segment definition in conjunction with user interface module 340. In other cases a listing, partial listing, or statistical profile of consumers in the newly defined segment can be rendered.

User feedback sub-module 342 is optionally configured to receive user-provided feedback on the rendered segment definition. See reference numeral 2620 in FIG. 3F. The user-provided feedback provides an indication of how accurately the natural language query was mapped onto the resulting segment definition. Where user feedback is received, the segment definition and custom thesaurus 355 can be updated as appropriate. See reference numeral 2630. This allows subsequent natural language queries to be mapped onto formal segment definitions with greater accuracy. User-approved segment definitions can also form the basis for updating information provided in token repository 350, including updates to the raw values listed for segment token types "domain" and "event". Such updates can be made based directly on the user-approved segment definitions, or alternatively, can be based on inferences drawn from machine learning algorithms configured to analyze patterns that are observed in user feedback over time. In some cases, for example where ambiguity exists regarding how to correlate a particular grammatical token, content consumption analytics engine 300 is configured to generate two or more proposed segment definitions which are presented to the user for selection and approval. In such case token repository 350 and/or custom thesaurus 355 are updated based on the user's selection.

User feedback enables content consumption analytics engine 300 to learn about both standard tokens (for example, "referrers") and customized tokens that are specific to a particular domain (for example, "lead-gen bookings" in the context of a travel services website). In general, user feedback can be incorporated at an appropriate audience level. For example, an inference about a standard token can be applied at a global level, such that the inference can be used by all future natural language queries. An inference about a customized token that would only apply to queries originating from a particular domain, such as queries from a particular company, can be applied only to a token repository and/or custom thesaurus that is searched in response to queries originating from a particular domain. Thus it will be appreciated that, in general, content consumption engine 300 can be configured to leverage multiple token repositories and/or custom thesauruses—some global and some domain-specific—when processing natural language queries. Likewise, where a segment definition comprises multiple criteria connected by logical operators, the different criteria can be subjected to user evaluation individually and/or as a composite definition.

One particular implementation of consumer segment definition method 2000 can be illustrated with respect to the example natural language query 10 illustrated in FIG. 1, "Visitors who came from Facebook". Such a query can be provided as spoken or textual input. Lexical analysis sub-module 326 segments this query into four grammatical tokens: "Visitors", "who", "came from", and "Facebook". "Who" is recognized as a stop word and is omitted from further processing. As illustrated in FIG. 4A, "Visitors" exists in token repository 350 and is correlated with segment token type "container". The words "came from" are recognized as a single grammatical token, but token repository 350 does not contain any corresponding segment token type for this token. Custom thesaurus 355 indicates that "referring domain" is a synonym for "came from". The token "referring domain" exists in token repository 350 and is correlated with segment token type "dimension". Token repository 350 also does not contain any segment token type for the grammatical token "Facebook". But custom thesaurus 355 indicates that "facebook.com" is a synonym for "Facebook". The token "facebook.com" exists in token repository 350 and is correlated with segment token type "raw value". Thus all of the grammatical tokens present in the original natural language query "Visitors who came from Facebook", other than the identified stop word "who", can be correlated with a segment token type.

Once all of the grammatical tokens are processed, the grammatical token correlated with segment token type "raw value" is compared to the raw values associated with segment token types "dimension" and "event" in token repository 350. As described above, the grammatical token correlated with segment token type "raw value" is "facebook.com". As illustrated in FIG. 4A, the raw values associated with segment token types "dimension" and "event" in token repository 350 include "facebook.com". Because an exact match was found, the grammatical token correlated with segment token type "raw value" is not subject to further manipulation. At this point grammatical tokens have been correlated with segment token types "container", "dimension", and "value", but no grammatical token has been correlated with segment token type "operator". As a result, the default grammatical token "equals" is correlated with segment token type "operator". Based on the foregoing correlations, the grammatical tokens can be mapped onto a formalized segment definition structure, such as a {dimension, operator, value} triplet that is placed in a {container}. In this example, the result is a visitor container with the rule "referring domain='facebook.com'" corresponding to the natural language query "Visitors who came from Facebook." The formalized segment definition can be presented to a user from whom feedback is solicited. Such feedback can be used to update the segment definition and/or custom thesaurus 355. Approved segment definitions can also form the basis for updates to token repository 350.

Figure 5:
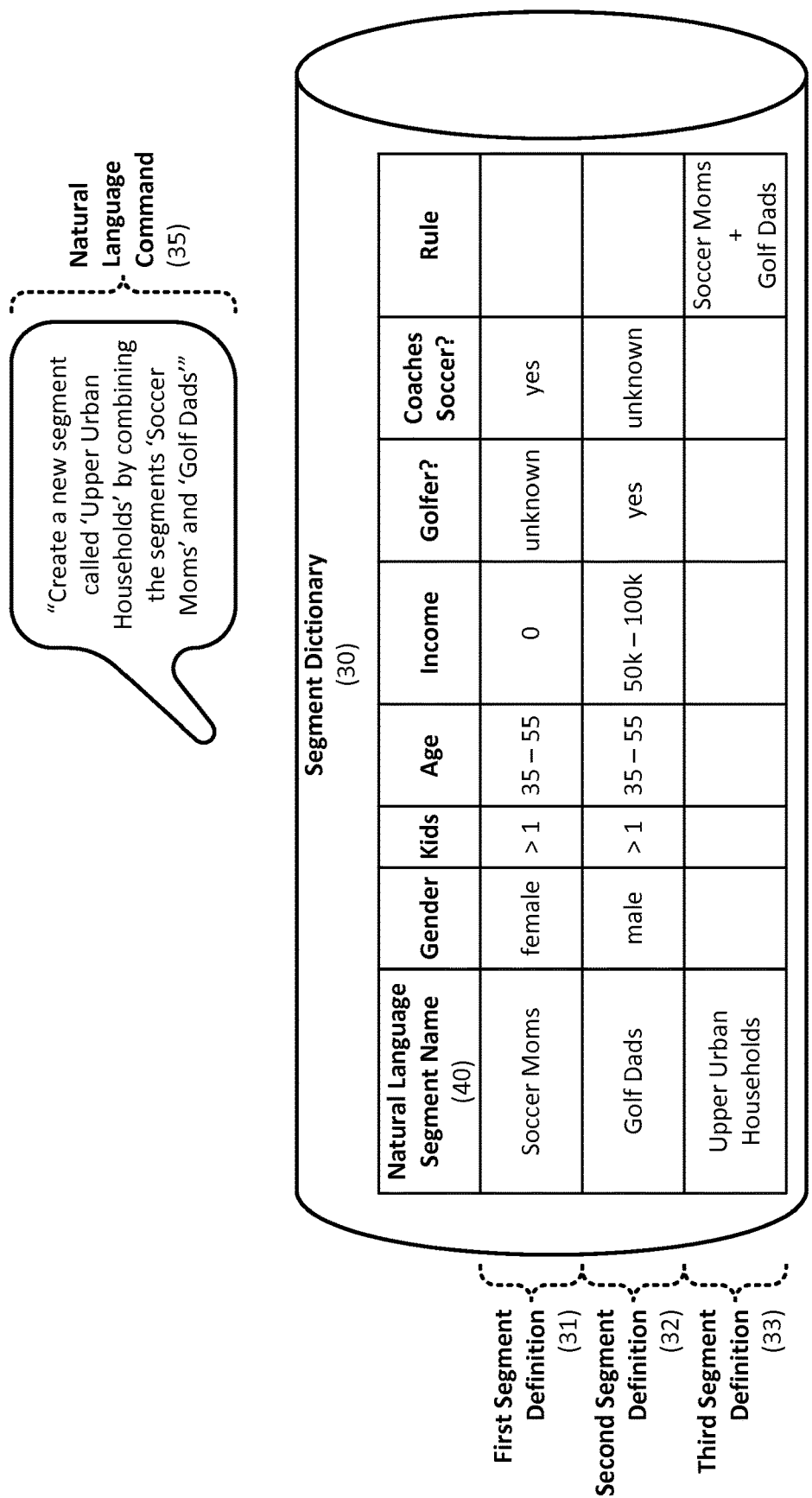
FIG. 5 schematically illustrates an example technique for using natural language segment names to perform a union operation to generate a new segment definition.

In certain embodiments content consumption analytics engine 300 is configured to assign a natural language name to a defined consumer segment. Use of natural language names facilitates subsequent reference and manipulation of such segments, for example using intersection, union, and set difference operations. A segment dictionary can be used to collect and manage the definitions as they are created, edited, and otherwise manipulated. For example, FIG. 5 schematically illustrates an example technique for using natural language segment names 40 to perform a union operation to generate a new segment definition. In particular, FIG. 5 illustrates a segment dictionary 30 that includes a first segment definition 31 for consumer segment "Soccer Moms" and a second segment definition 32 for consumer segment "Golf Dads". A user submits natural language command 35, "Create a new segment called 'Upper Urban Households' by combining the segments 'Soccer Moms' and 'Golf Dads'". Semantic decoding of the grammatical token "by combining" results in application of a union operation which is applied to the referenced "Soccer Moms" and "Golf Dads" segments. The segment definition rules for these two segments can be appended and saved as the definition for a third segment definition 33 which is named "Upper Urban Households". In this context, the natural language processing techniques disclosed herein can be used with existing multivariate techniques for handling unknown values in a segment definition.

Use of natural language names also facilitates other operations with previously defined consumer segments, including identification of consumers similar to those included within an existing segment. For instance, a command such as, "find consumers similar to [segment name] . . . " allows users to effectively broaden the reach and targeting of a campaign. Segment dictionary 30 can be stored in content consumption analytics engine 300 or in another networked storage resource.

One advantage of the natural language processing techniques disclosed herein is improved ease-of-use in the context of mobile and other portable device implementations where users may not have the benefit of a large display area to define, discover, and interact with segment characteristics. For instance, in one implementation a stored segment definition can be used to report complex definitions to a user in natural language. FIG. 6 is a flowchart illustrating an example method 3000 for using natural language processing techniques to discover information about consumer segmentation definitions. As can be seen, method 3000 includes a number of phases and sub-processes, the sequence of which may vary form one embodiment to another. However, when considered in the aggregate, these phases and sub-processes form a complete information discovery method that is responsive to user commands in accordance with certain of the embodiments disclosed herein. This method can be implemented, for example, using the system architecture illustrated in FIG. 2. However other system architectures can be used in other embodiments, as will be apparent in light of this disclosure. To this end, the correlation of the various functionalities shown in FIG. 6 to the specific components illustrated in FIG. 2 is not intended to imply any structural and/or use limitations. Rather, other embodiments may include varying degrees of integration wherein multiple functionalities are performed by one system or by separate systems. For instance, in an alternative embodiment a single module can be used to compile segment definition tokens and synthesize a natural language expression. Thus other embodiments may have fewer or more modules and sub-modules depending on the granularity of implementation. Numerous variations and alternative configurations will be apparent in light of this disclosure.

Still referring to FIG. 6, method 3000 commences with audio input/output sub-module 344 receiving a natural language query. See reference numeral 3110 in FIG. 6. One example of a natural language query is "What is the 'Upper Urban Households' segment?" The natural language query can be received using any appropriate input device, such as microphone that is integrated into a smartphone or a tablet computer. In one embodiment the natural language query is received using the same device on which content consumption analytics engine 300 is implemented, while in other embodiments the natural language query is received using a mobile device that is in communication with a server that provides functionality associated with content consumption analytics engine 300. In embodiments where a natural language query is typed instead of spoken, receiving the natural language query may comprise receiving textual input that is typed using a tactile or virtual keyboard.

In some instances the language of the received natural language query may be unknown. In such case speech-to-text sub-module 322 can be configured to detect the query language using any appropriate existing or subsequently-developed language detection algorithm. See reference numeral 3120 in FIG. 6. Speech-to-text sub-module 322 is also optionally configured to convert a received audio query into a textual query. See reference numeral 3130 in FIG. 6. In some cases language detection and audio conversion can be performed concurrently and may involve overlapping and/or shared operations. Although described in the context of an English query, in other embodiments method 3000 can be adapted to process non-English queries as well. In alternative embodiments language detection functionality may be omitted, in which case method 3000 is intended to process natural language queries in a single default language. Likewise, where the natural language query is typed instead of spoken, the process of converting a received audio query to a textual query can be omitted.

In general, the received natural language query can be understood as corresponding to a variety of different user operations. For example, in some cases the query may comprise a user command to establish a new consumer segmentation. In other cases the query may comprise a user request for information regarding existing segmentations. For example, a query beginning with "What are [name] . . .", or the like, can be interpreted as a request for information regarding an existing segmentation, also referred to as a "definitional query". In alternative implementations the user submitting the query can identify the query type separately from submission of the query itself, such as via a user interface configured to receive a query type selection. Thus once a textual query is produced, lexical analysis sub-module 326 can be configured to identify a definitional query, such as with reference to the query language itself, or alternatively, with reference to separate user input. See reference numeral 3140 in FIG. 6.

Where a definitional query is identified, lexical analysis sub-module 326 can be further configured to retrieve each condition predicate for the segment name identified in the query. See reference numeral 3150 in FIG. 6. This can be accomplished with reference to a segment dictionary, such as segment dictionary 30 illustrated in FIG. 5. For example, first segment definition 31, "Soccer Moms", can be understood as being based on the conditions predicate "gender=female", "kids>1", "35<age<55", and "coaches soccer=yes". Where a composite segmentation is defined by a rule, each of the conditions predicate for the segments that comprise the composite segment can be recursively retrieved. For example, the third segment definition 33, "Upper Urban Households", can be understood as being based on the various conditions predicate that define both the Soccer Moms and Golf Dads segments. Once the conditions predicate are retrieved from segment dictionary 30, natural language generation module 330 compiles a segment definition token triplet {attribute, operator, value} for each condition predicate. See reference numeral 3160 in FIG. 6. For example, first segment definition 31, "Soccer Moms", can be understood as comprising segment definition token triplets {gender, equals, female}, {kids, greater than or equal to, one}, {coaches soccer; equals; yes}.

Natural language generation module 330 is configured to synthesize a natural language expression based on the resolved segment definition token triplets. See reference numeral 3170 in FIG. 6. In some cases this can be accomplished with reference to text-to-speech dictionaries and sub-modules. For example, in one embodiment the natural language segment name is provided first, followed by the identified predicate attribute, operator, and value. If appropriate, Boolean operators such as "and", "or", and "not" are specified using natural language. For example, first segment definition 31, "Soccer Moms", can be rendered with the natural language expression, "The Soccer Moms segment includes females with one or more kids having age between 35 and 55 who coach soccer". Where a segmentation is defined by a rule, the rule can be expressed, optionally followed by a definition of the individual segments that are used to form the rule. For example, third segment definition 33, "Upper Urban Households", can be rendered with the natural language expression, "The Upper Urban Households segment includes Soccer Moms and Golf Dads". This is optionally followed by a natural language definition of both Soccer Moms and Golf Dads. Once the natural language expression is synthesized, audio input/output sub-module 344 is optionally configured to render the natural language expression aurally. See reference numeral 3180 in FIG. 6. In alternative embodiments the natural language expression is rendered textually, such as via display on a display screen.

CONCLUSION

Numerous configurations and variations will be apparent in light of this disclosure. For instance, one example embodiment provides a method for consumer segmentation that comprises parsing a received natural language query into a plurality of grammatical tokens. The method further comprises correlating a validated grammatical token with a segment token type extracted from a token repository. The validated grammatical token is derived from one of the plurality of grammatical tokens. The method further comprises obtaining a segment definition structure that comprises a plurality of segment token type placeholders arranged in a logical order. The method further comprises mapping the validated grammatical token onto the segment definition structure based on the segment token type and a location of a matching segment token type placeholder within the segment definition structure. The method further comprises rendering a segment definition that conforms to the segment definition structure and comprises the validated grammatical token. In some cases rendering the segment definition comprises compiling a listing of consumers included within the segment definition. In some cases the method further comprises adding the segment definition to a segment dictionary. In some cases the method further comprises using a custom thesaurus to derive the validated grammatical token, wherein the derived grammatical token (a) is synonymous with a grammatical token parsed from the natural language query, and (b) is correlated with a segment token type in the token repository. In some cases the segment definition structure is a predefined segment definition structure that is obtained from a memory resource. In some cases the segment definition structure is obtained from a user defined sequence of segment token type placeholders arranged in the logical order. In some cases the natural language query is received via a microphone, and the rendered segment definition is output aurally using a text-to-speech module. In some cases the validated grammatical token is identical to one of the grammatical tokens parsed from the natural language query. In some cases the method further comprises selecting the segment token type that is extracted from the token repository based on a token type hierarchy. In some cases the method further comprises selecting the segment token type that is extracted from the token repository based on an approximate match between one of the grammatical tokens parsed from the natural language query and a grammatical token stored in the token repository.

Another example embodiment of the present invention provides a system for consumer segmentation that comprises a natural language processing module configured to receive a natural language query and to parse the query into a plurality of grammatical tokens. The system further comprises a token repository data structure that (a) establishes a correlation between a grammatical token and at least one segment token type and (b) includes a raw value for a grammatical token correlated with at least one of segment token type "dimension" and segment token type "event". The system further comprises a consumer segmentation module configured to render a segment definition based on the natural language query. The segment definition includes a plurality of verified grammatical tokens that are stored in the token repository data structure and wherein the plurality of verified grammatical tokens are arranged according to a logical sequence of segment token types. The system further comprises a user interface module configured to receive user feedback on the rendered segment definition. In some cases the system further comprises a custom thesaurus containing a plurality of grammatical tokens and a corresponding plurality of synonymous terms, wherein at least one of the plurality of grammatical tokens is not correlated with a segment token type in the token repository. In some cases (a) the received user feedback modifies a grammatical token included in the rendered segment definition; and (b) the user interface module is further configured to add a record to the token repository that correlates the modified grammatical token with a segment token type. In some cases the system further comprises an alternative token repository data structure that establishes a correlation between a grammatical token in an alternative language and the at least one segment token type.

Another example embodiment of the present invention provides a computer readable medium encoded with instructions that, when executed by one or more processors, cause a process for consumer segmentation analysis to be carried out. The process comprises parsing a received natural language query into a plurality of grammatical tokens. The process further comprises correlating a validated grammatical token with a segment token type extracted from a token repository. The validated grammatical token is derived from one of the plurality of grammatical tokens. The process further comprises obtaining a segment definition structure that comprises a plurality of segment token type placeholders arranged in a logical order. The process further comprises mapping the validated grammatical token onto the segment definition structure based on the segment token type and a location of a matching segment token type placeholder within the segment definition structure. The process further comprises rendering a segment definition that conforms to the segment definition structure and comprises the validated grammatical token. In some cases the natural language query comprises a command to define the segment definition in terms of two or more existing segment definitions. In some cases the consumer segmentation analysis process further comprises (a) presenting the rendered segment definition to a user; (b) receiving feedback from the user that replaces the validated grammatical token included in the rendered segment definition with an alternative grammatical token; and (c) adding a record to the token repository that correlates the alternative grammatical token with a segment token type. In some cases the consumer segmentation analysis process further comprises (a) detecting a language of the natural language query; and (b) obtaining the segment definition structure based on the detected language of the natural language query. In some cases (a) the validated grammatical token is correlated with a segment token type "raw value"; and (b) the consumer segmentation analysis process further comprises comparing the validated grammatical token with raw values for grammatical tokens correlated with at least one of segment token type "dimension" and segment token type "event". In some cases the consumer segmentation analysis process further comprises (a) determining that one of the segment token type placeholders is associated with an undefined segment token type that is not correlated with any validated grammatical token; and (b) assigning a default grammatical token to the undefined segment token type.

The foregoing detailed description has been presented for illustration. It is not intended to be exhaustive or to limit the disclosure to the precise form described. Many modifications and variations are possible in light of this disclosure. Therefore it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for consumer segmentation that comprises:
   parsing a received natural language query into a plurality of received grammatical tokens;
   accessing a token repository that correlates certain grammatical tokens with one or more segment token types;
   identifying a first received grammatical token that also exists in the token repository;
   correlating the first received grammatical token with a particular segment token type based on a correlation that is defined in the token repository;
   correlating a second received grammatical token with a raw value segment token type, wherein the second received grammatical token does not exist in the token repository;
   identifying a modified second grammatical token that (a) exists in the token repository, (b) is correlated with the raw value segment token type, and (c) represents a closest matching grammatical token based on the second received grammatical token;
   obtaining a segment definition structure that comprises a plurality of segment token type placeholders arranged in a logical order;
   mapping the first grammatical token and the modified second grammatical token onto the segment definition structure based on a location of a matching segment token type placeholder within the segment definition structure; and
   rendering a segment definition that corresponds to the received natural language query, conforms to the segment definition structure and comprises the first grammatical token and the modified second grammatical token.

2. The method of claim 1, wherein rendering the segment definition comprises compiling a listing of consumers included within the segment definition.

3. The method of claim 1, further comprising adding the segment definition to a segment dictionary.

4. The method of claim 1, wherein the segment definition structure is obtained from a memory resource.

5. The method of claim 1, wherein the segment definition structure is obtained from a user defined sequence of segment token type placeholders arranged in the logical order.

6. The method of claim 1, wherein:
the natural language query is received via a microphone, and
the segment definition is rendered aurally using a text-to-speech module.

7. The method of claim 1, further comprising correlating the particular segment token type with the first received grammatical token based on a token type hierarchy.

8. The method of claim 1, wherein:
the particular segment token type is a dimension segment token type or an event segment token type; and
the segment definition defines the first received grammatical token in terms of the modified second grammatical token.

9. A consumer segmentation system that comprises:
a memory device having stored therein a token repository data structure that (a) correlates certain grammatical tokens with at least one segment token type and (b) includes a raw value for a particular grammatical token that is correlated with at least one of a dimension segment token type and an event segment token type; and
a processor that is configured to execute instructions stored in the memory device that, when executed cause the processor to carry out a process for defining a consumer segmentation, the process comprising:
receiving a natural language query;
parsing the natural language query into a plurality of received grammatical tokens;
identifying a first received grammatical token that exists in the token repository data structure;
correlating a second received grammatical token that does not exist in the token repository data structure with a raw value segment token type;
generating a segment definition based on the natural language query, wherein the segment definition includes the first and second received grammatical tokens arranged according to a logical sequence of segment token types; and
receiving user feedback on the segment definition.

10. The system of claim 9, wherein the process further comprises:
modifying the first received grammatical token based on the received user feedback, thus resulting in a modified first grammatical token; and
adding a record to the token repository data structure that correlates the modified first grammatical token with a segment token type with which the first received grammatical token is correlated.

11. The system of claim 9, further comprising an alternative token repository data structure that establishes a correlation between a grammatical token in an alternative language and at least one of the segment token types.

12. A non-transitory computer readable medium encoded with instructions that, when executed by one or more processors, cause a process for consumer segmentation analysis to be carried out, the process comprising:
parsing a received natural language query into a plurality of received grammatical tokens;
accessing a token repository that correlates certain grammatical tokens with one or more segment token types;
correlating a first received grammatical token with a raw value segment token type;
comparing the first received grammatical token with raw values for grammatical tokens correlated with at least one of a dimension segment token type and an event segment token type in the token repository;
identifying a validated grammatical token that is correlated with the raw value segment token type in the token repository, and that is an approximate, but not exact, match with the first received grammatical token;
obtaining a segment definition structure that comprises a plurality of segment token type placeholders arranged in a logical order;
mapping the validated grammatical token onto the segment definition structure based on a location of a matching raw value segment token type placeholder within the segment definition structure; and
rendering a segment definition that conforms to the segment definition structure and comprises the validated grammatical token.

13. The non-transitory computer readable medium of claim 12, wherein the natural language query comprises a command to define the segment definition in terms of two or more existing segment definitions.

14. The non-transitory computer readable medium of claim 12, wherein the consumer segmentation analysis process further comprises:
presenting the rendered segment definition to a user;
receiving feedback from the user that replaces the validated grammatical token included in the rendered segment definition with an alternative grammatical token; and
adding a record to the token repository that correlates the alternative grammatical token with the raw value segment token type.

15. The non-transitory computer readable medium of claim 12, wherein the consumer segmentation analysis process further comprises:
detecting a language of the natural language query; and
obtaining the segment definition structure based on the detected language of the natural language query.

16. The non-transitory computer readable medium of claim 12, wherein the consumer segmentation analysis process further comprises:
determining that one of the segment token type placeholders is associated with an undefined segment token type that is not correlated with any of the received grammatical tokens; and
assigning a default grammatical token to the undefined segment token type.

17. The non-transitory computer readable medium of claim 12, wherein the validated grammatical token represents a closest matching grammatical token in the token repository based on the first received grammatical token.

18. The non-transitory computer readable medium of claim 12, wherein:
the received natural language query defines a consumer segmentation; and the segment definition also defines the consumer segmentation.

19. The non-transitory computer readable medium of claim 12, wherein the consumer segmentation analysis process further comprises:
   identifying a second received grammatical token that exists in the token repository; and
   mapping the second received grammatical token onto the segment definition structure.

20. The non-transitory computer readable medium of claim 12, wherein the consumer segmentation analysis process further comprises:
   identifying a second received grammatical token that does not exit in the token repository;
   identifying a modified second grammatical token that is indicated as being synonymous to the second received grammatical token in a custom thesaurus; and
   mapping the modified second grammatical token onto the segment definition structure.

* * * * *